United States Patent
Perry et al.

(10) Patent No.: US 9,119,389 B2
(45) Date of Patent: Sep. 1, 2015

(54) METHODS AND SYSTEMS FOR HUMANE CAPTURE, MAINTENANCE, AND RELEASE OF WILDLIFE

(71) Applicant: Perry Le Pews Wildlife Management LLC, Marstons Mills, MA (US)

(72) Inventors: Kevin D. Perry, Marstons Mills, MA (US); Kyle D. Perry, Marstons Mills, MA (US)

(73) Assignee: Perry Le Pews Wildlife Management LLC, Marstons Mills, MA (US)

(*) Notice: Subject to any disclaimer, the term of this patent is extended or adjusted under 35 U.S.C. 154(b) by 41 days.

(21) Appl. No.: 13/975,481

(22) Filed: Aug. 26, 2013

(65) Prior Publication Data

US 2014/0055270 A1     Feb. 27, 2014

Related U.S. Application Data

(60) Provisional application No. 61/693,565, filed on Aug. 27, 2012.

(51) Int. Cl.
    *G08B 23/00*      (2006.01)
    *A01M 23/16*      (2006.01)
    *A01M 31/00*      (2006.01)
    *A01M 23/20*      (2006.01)

(52) U.S. Cl.
     CPC ............ *A01M 23/16* (2013.01); *A01M 23/20* (2013.01); *A01M 31/002* (2013.01)

(58) Field of Classification Search
     CPC ..... A01M 23/16; A01M 23/18; A01M 23/20; A01M 23/22; A01M 23/24

USPC ............ 340/573.1, 573.2; 119/339, 330, 331, 119/340, 416–418, 421; 43/58, 60, 69
See application file for complete search history.

(56) References Cited

U.S. PATENT DOCUMENTS

| | | | |
|---|---|---|---|
| 5,799,614 A * | 9/1998 | Greenwood | 119/452 |
| 6,202,340 B1 * | 3/2001 | Nieves | 43/61 |
| 6,775,946 B2 | 8/2004 | Wright | |
| 8,061,076 B2 * | 11/2011 | Kelley | 43/61 |
| 2002/0184811 A1 * | 12/2002 | Wright | 43/58 |
| 2003/0213161 A1 * | 11/2003 | Gardner et al. | 43/61 |
| 2005/0097808 A1 | 5/2005 | Vorhies et al. | |
| 2006/0042153 A1 | 3/2006 | Bowerman | |
| 2007/0114294 A1 * | 5/2007 | Ashton, Jr. | 236/51 |
| 2007/0169718 A1 * | 7/2007 | Conger et al. | 119/455 |
| 2007/0181660 A1 * | 8/2007 | Izyk | 231/2.1 |
| 2007/0256643 A1 * | 11/2007 | Coiro et al. | 119/457 |
| 2008/0178516 A1 * | 7/2008 | Hall | 43/61 |
| 2008/0204253 A1 * | 8/2008 | Cottee et al. | 340/573.2 |
| 2009/0193707 A1 | 8/2009 | Moran et al. | |
| 2010/0282184 A1 | 11/2010 | Larson | |
| 2011/0138676 A1 * | 6/2011 | Moustirats | 43/61 |
| 2012/0012072 A1 * | 1/2012 | Katers | 119/803 |
| 2013/0081323 A1 * | 4/2013 | Alfarhan | 43/62 |

* cited by examiner

*Primary Examiner* — Eric M Blount
(74) *Attorney, Agent, or Firm* — Hyperion Law, LLC; Cynthia M. Gilbert (57) ABSTRACT

A method for humane capture, maintenance, and release of wildlife includes capturing, by a wildlife capture unit, a wild animal in a wildlife containment unit. The method includes transmitting, by the wildlife capture unit, to a remote communications device, a notification of the capture of the wild animal. The method includes modifying, by the wildlife capture unit, an environmental condition of a wildlife containment unit to sustain the wild animal.

18 Claims, 8 Drawing Sheets

METHODS AND SYSTEMS FOR HUMANE CAPTURE, MAINTENANCE, AND RELEASE OF WILDLIFE

CROSS-REFERENCE TO RELATED APPLICATIONS

This application claims priority from U.S. Provisional Patent Application Ser. No. 61/693,565, filed on Aug. 27, 2012, entitled "Methods and Systems for Humane Capture, Maintenance, and Release of Wildlife," which is hereby incorporated by reference.

BACKGROUND

The disclosure relates to the capture of wildlife. More particularly, the methods and systems described herein relate to the humane capture, maintenance, and release of wildlife.

Conventional systems for wildlife removal typically include cages and traps that usually cause injuries to captured wildlife. Conventional systems that do attempt to prevent injury to captured wildlife may not injure the captured wildlife but do not typically provide any resources for the captured wildlife, such as heating, ventilation, air conditioning, food, water, or other resources for maintaining the health or well-being of the captured wildlife.

SUMMARY

In one aspect, a method for humane capture, maintenance, and release of wildlife includes capturing, by a wildlife capture unit, a wild animal. The method includes transmitting, by the wildlife capture unit, to a remote communications device, a notification of the capture of the wild animal. The method includes managing, by the wildlife capture unit, an environmental condition of the wildlife containment unit to sustain the wild animal.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

In some embodiments, the methods and systems described herein provide functionality for humane capture, maintenance, and release of wildlife.

For purposes of this application it should be understood that wildlife or wild animal may include any type of animal that is roaming free and wherein the user desires to capture said animal. For instance, one of ordinary skill in the art would readily recognize that said device and system could be used to capture a lost dog or cat.

Figure 1A:
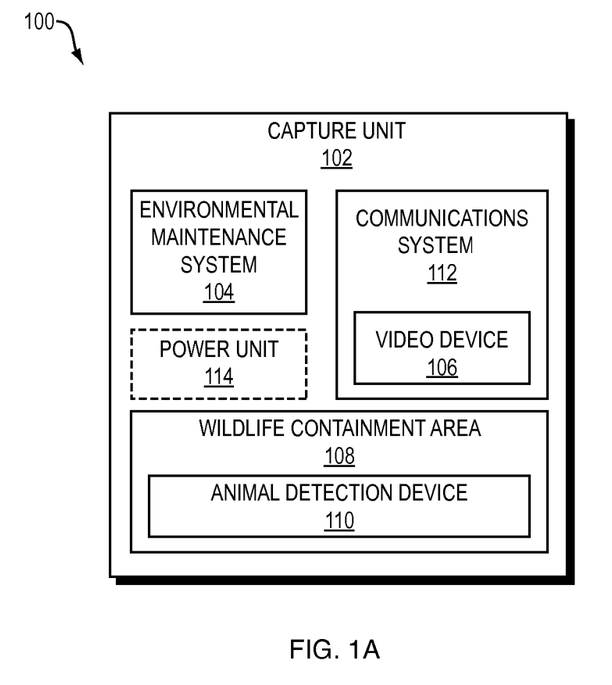
FIG. 1A is a block diagram depicting one embodiment of a system for humane capture, maintenance, and release of wildlife.

Referring now to FIG. 1A, a block diagram depicts one embodiment of a system for humane capture, maintenance, and release of wildlife. In brief overview, the system includes a capture unit 102, an environmental maintenance system 104, a communications system 112, a video device 106, a wildlife containment area 108, and an animal detection device 110. The system may also include a power unit 114. The capture unit 102 may include the wildlife containment area 108 with the animal detection device 110 in a separate area from the environmental maintenance system 104, the communications system 112 and the video device 106; alternatively, all components may be stored within the same area. The power unit 114 may optionally provide a solar charger that charges one or more batteries during the day. The capture unit 102 may include a thermal view that displays data such as, for example, and without limitation, thermal data, temperature data, and humidity data. In some embodiments, the wildlife containment area 108 is customized for containing and safely maintaining young animals, including babies. In one embodiment, the environmental maintenance system 104 includes a fan. In another embodiment, the environmental maintenance system includes a heater. In other embodiments, the capture unit 102 is attached to a structure, such as a house or garage, via a bracket such as a louver bracket or a roof ridge bracket.

Figure 1B:
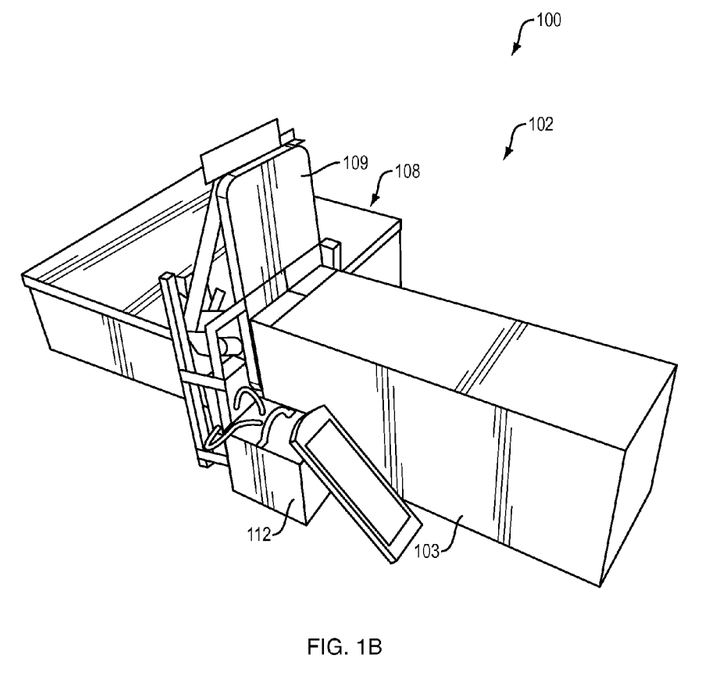
FIG. 1B is a block diagram depicting certain aspects of one embodiment of a system for humane capture, maintenance, and release of wildlife.

Referring now to FIG. 1B, a block diagram depicts certain aspects of one embodiment of a system for humane capture, maintenance, and release of wildlife. As shown in the embodiment depicted by FIG. 1B, the capture unit 102 includes a wildlife containment area 108 and a communications system 112. In one embodiment, an animal entering the capture unit 102 through the entrance 103 and accessing the wildlife containment area 108 triggers the animal detection device 110 (not shown in FIG. 1B), resulting in the closing of the door 109 to the wildlife containment area 108. As will be discussed in greater detail below, triggering the animal detection device 110 may also result in activation of the communications system 112, alerting a user of the system 100 as to the capture of the animal in the capture unit 102; triggering the animal detection device 110 may also result in activation of the environmental maintenance system 104 (not shown in FIG. 1B). It should be understood that the configuration of the capture unit 102 shown in FIG. 1B is but one example of an embodiment of the capture unit 102; other embodiments may include different shapes and sizes to accommodate different types of wildlife.

Figure 1C:
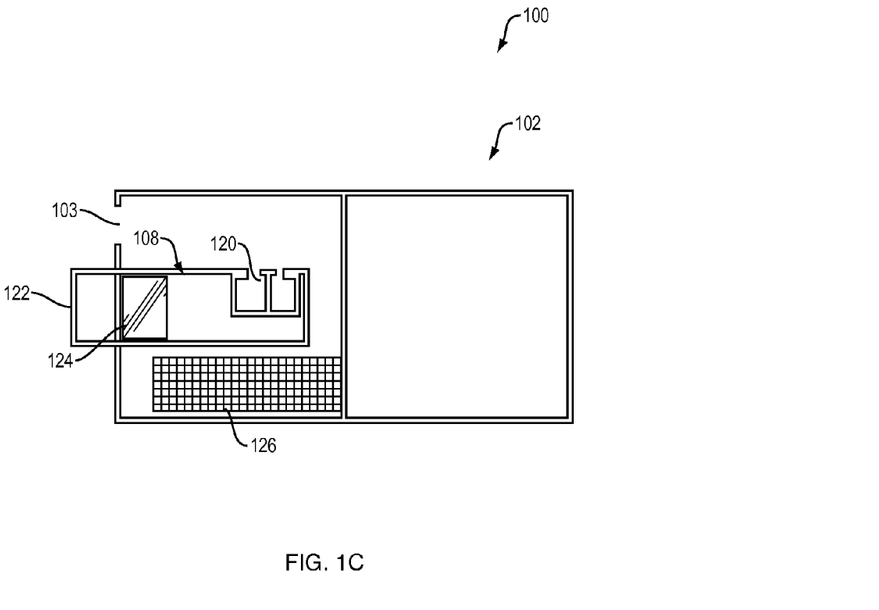
FIG. 1C is a block diagram depicting certain aspects of one embodiment of a system for humane capture, maintenance, and release of wildlife.

Referring now to FIG. 1C, a block diagram depicts certain aspects of one embodiment of a system for humane capture, maintenance, and release of wildlife. As shown in the embodiment depicted by FIG. 1C, the capture unit 102 includes an entrance 103, a wildlife containment area 108, a feeding station 120, a tech service opening 122, and a view window 124. The feeding station 120 may contain food or water for sustaining a contained animal until a wildlife management professional arrives to remove the animal. The tech service opening 122 and the view window 124 may provide the wildlife management professional with functionality for viewing the contained animal, and cleaning and maintaining the feeding station 102. In one embodiment, the tech service opening 122 allows the wildlife management professional to provide additional food to a captured animal without allowing the captured animal to escape. In some embodiments, the capture unit 102 optionally includes a wire mesh ramp 126. For example, if the capture unit 102 is customized for subterraneous or burrowing animals (e.g., skunks and possums), the capture unit 102 may include both an upper level and a lower level and the wire mesh ramp 126 allows a captured animal to move between the two levels.

FIGS. 1B and 1C provide illustrative examples of capture units 102, however it should be understood that these are not limiting and that the design and layout of a particular capture unit 102 may be modified to suit the needs of a particular wildlife management professional. For example, the wildlife containment area 108 may need to be larger or smaller depending on the size of the targeted wild animal (e.g., larger for raccoons and smaller for squirrels). The wildlife containment area may also be formed of wood, metal, plastic, a biodegradable material, and so forth. In some instances, the material is designed to allow a captured animal to eventually chew or claw through the containment area and escape.

Figure 2:
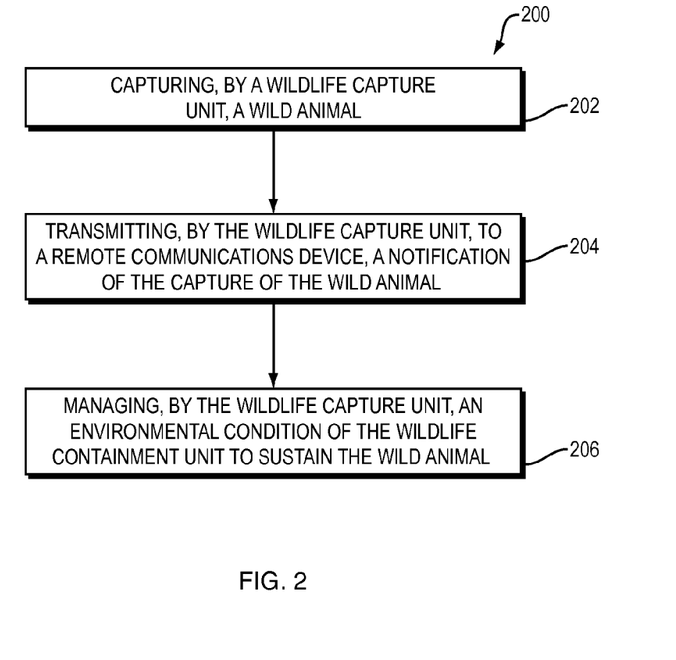
FIG. 2 is a flow diagram depicting an embodiment of a method for humane capture, maintenance, and release of wildlife.

Referring now to FIG. 2, and in connection with FIGS. 1A-1C, a flow diagram depicts one embodiment of a method 200 for humane capture, maintenance, and release of wildlife. In brief overview, the method 200 includes capturing, by a wildlife capture unit, a wild animal (202). The method 200 includes transmitting, by the wildlife capture unit, to a remote communications device, a notification of the capture of the wild animal (204). The method 200 includes managing, by the wildlife capture unit, an environmental condition of the wildlife containment unit to sustain the wild animal (206).

The capture unit 102 captures a wild animal (202). In some embodiments, the capture unit 102 may be installed at an entrance to a structure (such as, without limitation, a chimney). For example, the capture unit 102 may be installed at a location in a structure where wildlife is known to attempt to enter the structure. In one of these embodiments, the capture unit 102 may include an outer area and an inner area. By way of example, should an animal enter an outer area of the capture unit 102, the animal may still exit the structure without setting off the animal detection device 110. However, and as an alternate example, should an animal enter the capture unit 102 and proceed through the outer area to the inner area of the capture unit 102, the animal may enter the wildlife containment area 108 and trigger the animal detection device 110. In some embodiments, the capture unit 102 includes bait for luring an animal into the capture unit 102. In other embodiments, a wildlife management professional uses tools (such as a push pole 302 discussed in greater detail below) to push an animal into the capture unit 102.

In one embodiment, the animal detection device 110 includes an infrared device generating a beam; when an animal enters the wildlife containment area 108, it disrupts the beam, alerting the animal detection device 110 that something has entered the wildlife containment area 108. The animal detection device 110 may then close a circuit to close a door to the wildlife containment area 108, capturing the animal inside the wildlife containment area 108. For example, the animal detection device 110 may be connected to an arm motor (not shown), which controls a door switching gear that moves the door from an open position to a closed position and vice versa. In some embodiments, the animal detection device 110 includes a motion-sensing device. In other embodiments, the animal detection device 110 includes a micromagnetic switch. In further embodiments, the animal detection device 110 includes a weighted plate (e.g., with a switch that is activated when an animal steps on the weighted plate).

The examples above illustrate scenarios in which a wild animal enters the capture unit 102 and the system 100 contains the animal in the wildlife containment area 108 without human intervention. However, in other embodiments, a human is required to move the animal into the wildlife containment area 108.

Figure 3A:
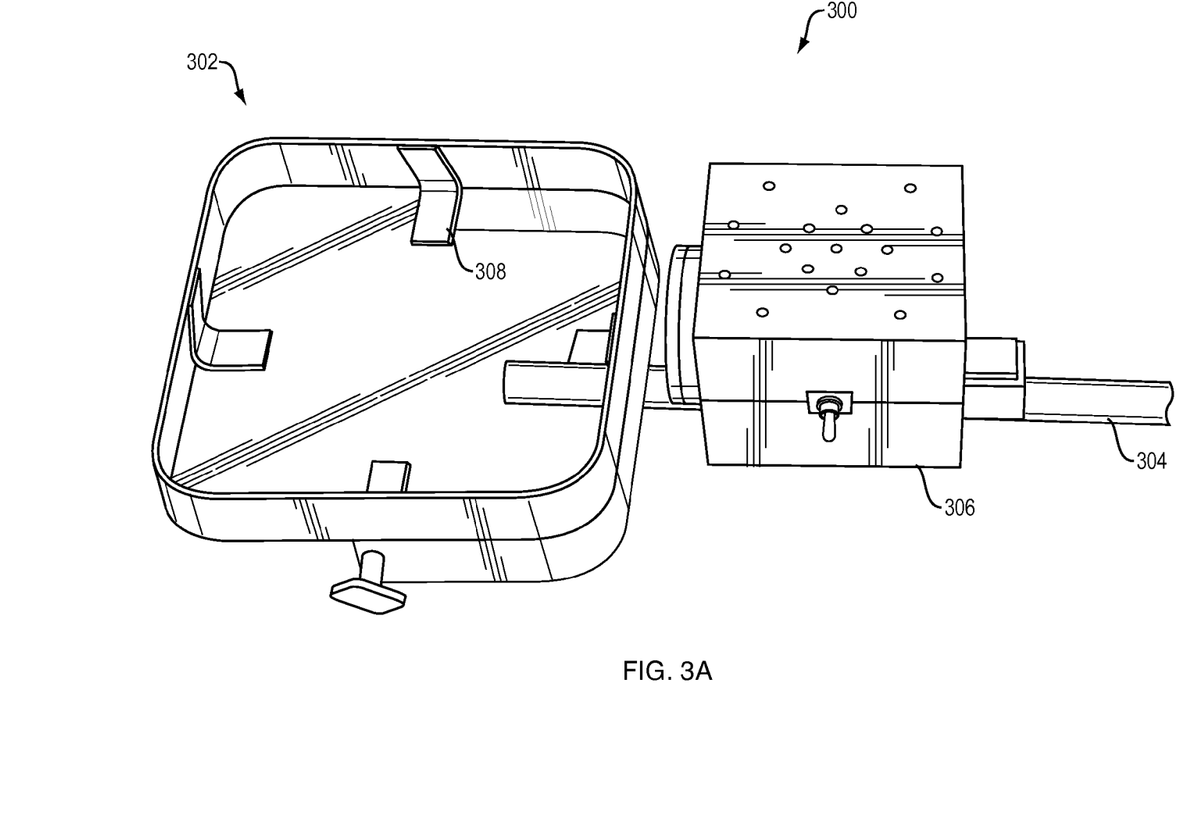
FIGS. 3A and 3B are block diagrams depicting certain aspects of one embodiment of a pole for use in moving a wild animal into a wildlife containment area.

Referring ahead to FIG. 3A, a block diagram depicts one embodiment of a push pole 302 for use in moving a wild animal into a wildlife containment area 108. As shown in FIG. 3A, in some embodiments, the push pole 302 includes a handle 304, an audio system 306, and a component 308. A human using the push pole 302 to move a wild animal into the wildlife containment area 108 may use the handle 304 to manipulate the push pole 302 (and thus the wild animal) at a distance from the wild animal; the length of the handle 304 may vary based upon the animal or a user preference. In one embodiment, the audio system 306 plays a sound that encourages a wild animal to move in the direction of the wildlife containment area 108. By way of example, and without limitation, the audio system 306 may play the sound of a predator of the wild animal, which may have the effect of having the wild animal move in the opposite direction of the sound—towards the wildlife containment area 108. As another example, if the wild animal is a raccoon, the audio system 306 may play a recording of a growling bobcat.

Figure 3B:
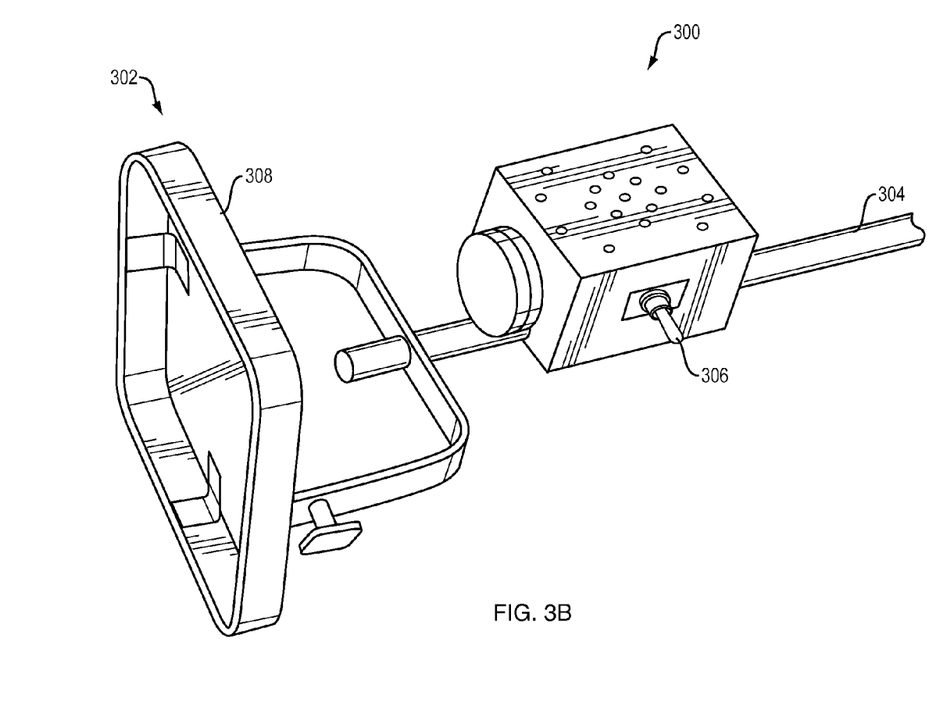

Referring ahead to FIG. 3B, the component 308 may be configured to allow for positioning of the component 308 in a structure and behind a body part of a wild animal (e.g., the animal's head or body). As shown in FIG. 3A, the component 308 was parallel to the handle 304; however, and as shown in FIG. 3B, the component 308 may be configurable so that the component 308 is perpendicular to the handle 304. The component 308 may include a solid material (such as a light, transparent, weather-resistant thermoplastic, e.g., PLEXIGLAS), formed into a shape, such as a square, with dimensions appropriate for fitting into a building structure, such as a chimney, behind the wild animal, blocking the wild animal's egress from the building structure. For example, if a wildlife management professional needs to move a raccoon up a chimney, the wildlife management professional may select a component 308 having dimensions such that the component 308 will fit inside the open space of the chimney, behind the raccoon; in such an example, the wildlife management professional can push the raccoon up the chimney, towards a wildlife containment area 108, and the component 308 prevents the raccoon from coming back down the chimney (and potentially injuring either the raccoon or the wildlife management professional). By using a transparent material to form the surface of the component 308, the wildlife management professional can see the wild animal and determine whether the wild animal has reached the wildlife containment area 108, but the wild animal cannot exit the structure. In one embodiment, the component 308 is removable so that a user of the push pole 302 may use a first component 308a in interacting with a first wild animal and may then remove the first component 308a, replacing it with a second component 308b for interacting with a second wild animal—for example, to select a different shape or size customized for either the wild animals or the structures through which the wild animals need to be pushed to reach the capture unit 102. Using the push pole 302, a human may move a wild animal into the wildlife containment area 108 from a safe distance.

Referring back to FIG. 2, the method 200 includes transmitting, by the wildlife capture unit, to a remote communications device, a notification of the capture of the wild animal (204). In one embodiment, the communications system 112 includes a telecommunications device; examples of telecommunications devices include, without limitation, telephones of any type (including, by way of example, mobile phones), computing devices of any type with access (wired or wireless) to a network over which to transmit data, and combinations of the two (including, by way of example, smart phones, tablet computers, and other devices providing some or all of the functionality of both a computer and a telephone).

In some embodiments, the animal detection device 110 controls the communications system 112. In one of these embodiments, the animal detection device 110 controls the communications system 112 directly. For example, the animal detection device 110 may activate a motor that pushes a physical button on the communications system 112 in order to transmit data from the communications system 112. In another of these embodiments, the animal detection device 110 controls the communications system 112 indirectly. For example, the animal detection device 110 may activate a timer upon disruption of an infrared beam or other detection system and the timer may, after a predetermined period of time, activate a motor that pushes a button on the communications system 112 in order to transmit data from the communications system 112. As another example, the animal detection device 110 may control both a door to the wildlife containment area 108 and the communications system 112. In such an example, when the animal detection device 110 closes the door, the door may depress one or more switches that close a circuit resulting in the activation of a timer that may, after a predetermined period of time, directly or indirectly, activate the communications system 112; alternatively, the door may have depressed one or more switches when open, and closing the door releases the switches, closing the circuit and resulting in activation of the timer. It should be understood that these examples are not limiting and that other configurations of the system are available for directly or indirectly activating the communications system 112. In another example, the timer and the communications system 112 are wired together such that when the timer determines that the predetermined period of time has elapsed, the timer may send an electronic signal to the communications system 112, directing the transmission of data from the communications system 112.

As an alternative to pushing a physical button, the system may activate a motor that controls a device capable of activating a software-based user interface element instead of a physical button (e.g., a device capable of interacting with a capacitive touch screen and/or of activating a capacitive touch sensor such as, for example, a stylus or other device incorporating conductive silicone, silver nylon fabric, or other material generating a difference in a level of electrical capacitance on a touch screen surface; or a device capable of transmitting a command (e.g., using an application programming interface (API)) to a software-based device). In still another of these embodiments, the communications system 112 includes a pre-programmed message that is transmitted to a user of the system 100 upon depression of a button on the communications system 112. For instance, an administrator of the system 100 may program the communications system 112 to transmit a notification when an animal is captured in the wildlife containment area 108.

In some embodiments, therefore, upon an animal disrupting an infrared beam or other detection system, the animal detection device 110 may not only close a door capturing the animal in the wildlife containment area 108, but also activate the communications system 112 to transmit a message to a remote communications device such as, without limitation, a communications device associated with a property manager, a wildlife management company, or other user of the system 100. In other embodiments, in addition to audio- and text-based messages, the communications system 112 may transmit video data. For example, the video device 106 may provide functionality for transmitting video of activity within the capture unit 102 to a remote communications device; for example, the animal detection device 110 may activate the video device 106 upon detecting that an animal has entered the capture unit 102 and the video device 106 may transmit video images of the animal to a wildlife management professional's remote communications device.

The method 200 includes managing, by the wildlife capture unit, an environmental condition of the wildlife containment unit to sustain the wild animal (206). In one embodiment, to manage the environmental condition, the capture unit 102 modifies a setting of the environmental maintenance system 104. In one embodiment the environmental maintenance system may include a heating/ventilation/air-conditioning (HVAC) system. Environmental conditions may include, without limitation, a temperature of the wildlife containment area 108 (and, therefore, an amount of heating or of air conditioning required to maintain the temperature), an amount of light (e.g., by turning on or off artificial lighting or by raising or lowering shades or film over windows into the capture unit 102), an amount of ventilation available, and an amount of food or water available to the animal (e.g., by opening or closing sections of the capture unit 102 accessible to the animal). For example, the capture unit 102 may open a door to a food container within the wildlife containment area 108 (not shown in FIGS. 1A-1B), allowing a captured animal access to food and/or water.

In some embodiments, the animal detection device 110 controls the environmental maintenance system 104. In one of these embodiments, the animal detection device 110 controls the environmental maintenance system 104 directly. For example, the animal detection device 110 may activate a motor that powers on the environmental maintenance system 104 or may actuate a mechanism for modifying the environmental maintenance system 104. In another of these embodiments, the animal detection device 110 controls the environmental maintenance system 104 indirectly. For example, the animal detection device 110 may activate a timer that controls the environmental maintenance system 104 after a predetermined period of time. As another example, the animal detection device 110 may control both a door to the wildlife containment area 108 and the environmental maintenance system 104. In such an example, when the animal detection device 110 closes the door, the door may depress one or more switches that close a circuit resulting in the activation of a timer that may, after a predetermined period of time, directly or indirectly, activate the environmental maintenance system 104; alternatively, the door may have depressed one or more switches when open, and closing the door releases the switches, closing the circuit and resulting in activation of the timer. It should be understood that these examples are not limiting and that other configurations of the system are available for directly or indirectly activating the environmental maintenance system 104.

Alternatively, the communications system 112 may control the environmental maintenance system 104. For example, the communications system 112 may receive, from a remote communications device (such as a mobile phone or computing device accessed by an administrator of the system 100 or other user of the system 100), a command to power on, power off, or modify a setting of the environmental maintenance system 104, and the communications system 112 may execute the command on behalf of the remote communications device. As one example, the remote communications device may establish a communications channel with the communications system 112 over which to transmit a signal for administration of the environmental maintenance system 104. As another example, and without limitation, the environmental maintenance system 104 may include a sensor (not shown) with which to determine that the remote communications device has contacted the communications system 112—for example, the environmental maintenance system 104 may include a sensor identifying a level of light emanating from the communications system 112 or may include a sensor decoding a dual-tone multi-frequency signal. By way of example only, the environmental maintenance system 104 may include a sensor determining that the communications system 112 has turned on a light, such as a backlight used on a mobile phone when the mobile phone receives an incoming call. As another example, where the communications system 112 is a mobile phone, the environmental maintenance system 104 may include a sensor that determines how many times the communications system 112 emits a ring tone, or what type of tone the communications system 112 emits. The environmental maintenance system 104 may include a processor receiving data from the sensor and identifying an action to take based on the data; for example, the processor may determine to turn on the environmental maintenance system 104, turn off the environmental maintenance system 104, or modify a level of heating or cooling provided by the environmental maintenance system 104. As another example, the processor may determine to turn on or off the animal detection device 110 based on the data. As a further example, the processor may determine to open or close a door within the capture unit 102 (e.g., enabling or disabling animal access to a food or water source) or a door to the wildlife containment area 108 (e.g., allowing an animal to leave the capture unit 102).

Figure 4A:
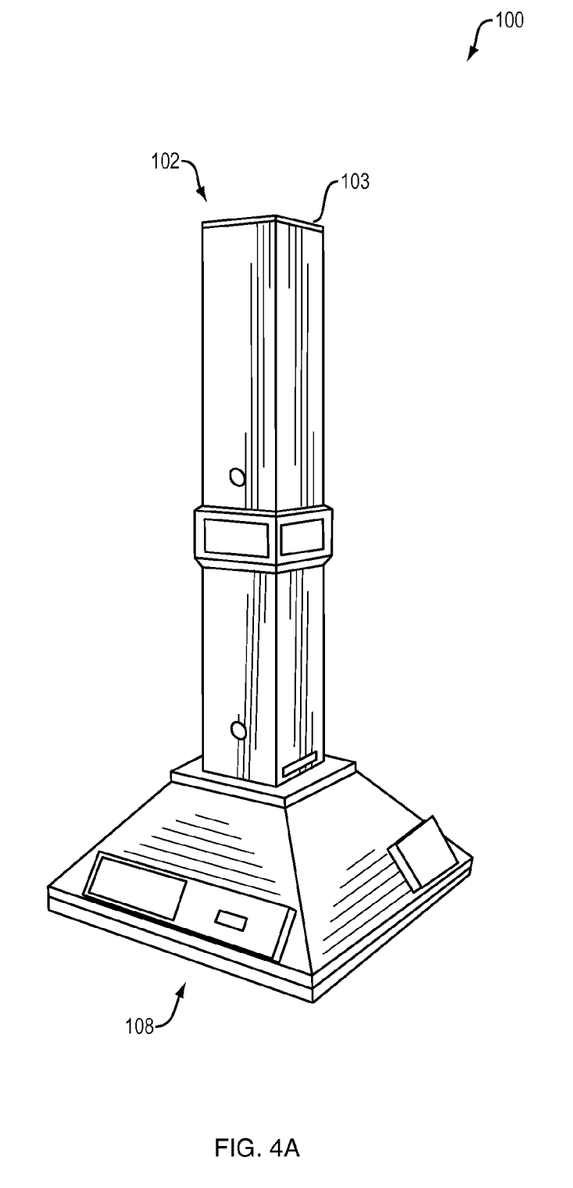
FIG. 4A is a block diagram depicting one embodiment of a capture unit designed to provide a habitable environment for a wild animal after capture of the animal.

Referring now to FIG. 4A, a block diagram depicts one embodiment of a capture unit 102 designed to provide a habitable environment for a wild animal after capture of the animal. In some embodiments, a habitable environment is required for the animal after removal of the capture unit 102 from a man-made structure (e.g., a residence or place of business), but before the animal is released into the wild. A capture unit 102 may be designed so that it can attach to a man-made structure or, as shown in FIG. 4A, to stand alone after removal from a man-made structure. For example, a wildlife management professional may place a capture unit 102 at a residence, wait for an animal to be captured, and then move the unit 102 with the animal to an area where the animal may safely be rehabilitated and released into the wild. By way of example, and without limitation, a customer of the wildlife management professional may complain of raccoon activity substantially in or about a residential area; the wildlife management professional may place the capture unit 102 in a location in the residential area where the raccoon may enter the capture unit 102. After the raccoon enters the capture unit 102, the wildlife management professional may relocate the capture unit 102 to a different part of the residential area (e.g., away from a house) or outside the residential area entirely, and leave the unit 102 in an area where the raccoon can be rehabilitated. As another example, a family of raccoons may have established a nest in a chimney and the wildlife management professional can move the raccoon family into the capture unit 102 (either by means of bait, encouragement, or use of a tool such as the push pole 302); when the wildlife management professional relocates the capture unit 102, the professional may leave the doors to the unit open, allowing the animals to come and go until they establish a nest in or near the new location.

Figure 4B:
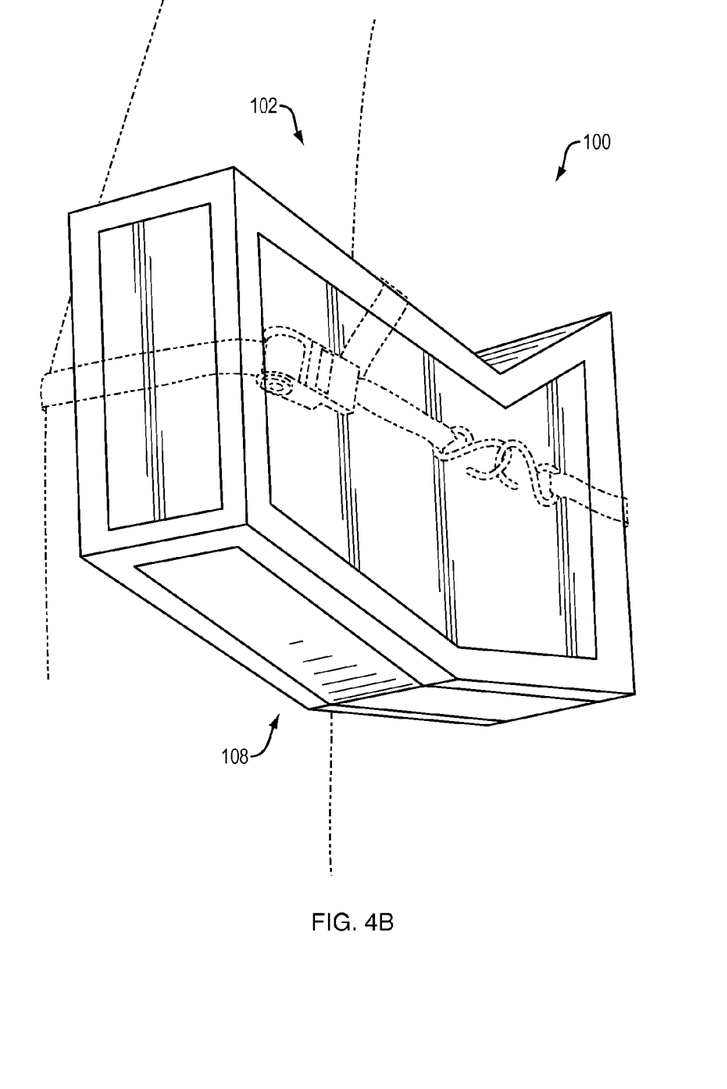
FIG. 4B is a block diagram depicting another embodiment of a capture unit designed to provide a habitable environment for a wild animal after capture of the animal.

Referring now to FIG. 4B, a block diagram depicts another embodiment of a capture unit 102 designed to provide a habitable environment for a wild animal after capture of the animal. As discussed above, the capture unit 102 may be provided in different sizes for different animals or locations. As shown in the example depicted by FIG. 4B, the capture unit 102 is smaller than the capture unit 102 depicted in FIG. 4A and intended for a different animal (e.g., squirrels instead of raccoons). Additionally, as shown in the example depicted by FIG. 4B, the capture unit 102 may be configured to attach to different types of structures—as shown in FIG. 4B, the capture unit may be attached to a tree trunk when used to capture certain wild animals (e.g., squirrels).

In some embodiments, implementing the methods and systems described herein allows users of the system 100 to leave a capture unit 102 at a structure, receive notification when the capture unit 102 has captured wildlife, and know that the captured wildlife will be in a comfortable environment with appropriate HVAC and other environmental conditions until the users of the system 100 can arrive at the structure and release the captured animal back into the wild. In one of these embodiments, for example, and without limitation, where the structure is a residential building, a wild animal captured in a unit 102, with the ability to minimize the amount of time before a wildlife management technician can arrive to remove the animal, provides any humans residing in the structure with the knowledge that the trapped animal will be removed promptly and without injury to the animal.

It should be understood that the systems described above may provide multiple ones of any or each of those components and these components may be provided on either a standalone basis or, in some embodiments, in combination. The phrases 'in one embodiment,' 'in another embodiment,' and the like, generally mean that the particular feature, structure, step, or characteristic following the phrase is included in at least one embodiment of the present disclosure and may be included in more than one embodiment of the present disclosure. However, such phrases do not necessarily refer to the same embodiment.

The systems and methods described above may be implemented as, or incorporate the use of, a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices. Each computer program within the scope of the claims below may be implemented in any programming language, such as assembly language, machine language, a high-level procedural programming language, or an object-oriented programming language. The programming language may, for example, be LISP, PROLOG, PERL, C, C++, C#, JAVA, or any compiled or interpreted programming language.

Having described certain embodiments of methods and systems for the humane capture, maintenance, and release of wildlife, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for humane capture, maintenance, and release of wildlife, the method comprising:
   capturing, by a wildlife capture unit, a wild animal in a wildlife containment unit;
   transmitting, by the wildlife capture unit, to a remote communications device, a notification of the capture of the wild animal; and
   automatically modifying, by the wildlife capture unit, an environmental condition of a wildlife containment unit to sustain the wild animal upon transmission of the notification to the remote communications device.

2. The method of claim 1 further comprising determining, by an animal detection device coupled to the wildlife capture unit, that the wild animal has entered the wildlife containment area.

3. The method of claim 2 further comprising directing, by the animal detection device, a communications system in communication with the wildlife capture unit, to transmit the notification of the capture of the wild animal to the remote communications device.

4. The method of claim 1, wherein transmitting further comprises transmitting, by the wildlife capture unit, to the remote communications device, video of activity within the wildlife containment unit.

5. The method of claim 1, wherein transmitting further comprises transmitting, by the wildlife capture unit, to the remote communications device, an audio notification of the capture of the wild animal.

6. The method of claim 1, wherein transmitting further comprises transmitting, by the wildlife capture unit, to the remote communications device, a text-based notification of the capture of the wild animal.

7. The method of claim 1, wherein transmitting further comprises transmitting, by the wildlife capture unit, to the remote communications device, the notification of the capture of the wild animal, responsive to receiving an indication that the wildlife capture unit has captured the wild animal.

8. The method of claim 1 further comprising receiving, by the wildlife capture unit, from the remote communications device, an instruction to modify the environmental condition of the wildlife containment unit.

9. The method of claim 1, wherein modifying an environmental condition, by the wildlife capture unit, further comprises modifying a setting of at least one of heating, ventilation, air conditioning, lighting, and accessibility to an amount of food available to the wild animal in the wildlife containment unit.

10. The method of claim 1, wherein capturing, by the wildlife capture unit, further includes using a push pole to guide a wild animal into the wildlife capture unit.

11. A system for humane capture, maintenance, and release of wildlife, the system comprising:
   a wildlife capture unit capturing a wild animal within a wildlife containment area;
   a communications system in communication with the wildlife capture unit and transmitting, to a remote communications device, a notification of the capture of the wild animal; and
   means for automatically modifying an environmental condition of the wildlife containment unit to sustain the wild animal upon transmission of the notification to the remote communications device.

12. The system of claim 11 further comprising an animal detection device coupled to the wildlife capture unit, determining that the wild animal has entered the wildlife containment area, and directing the communications system to transmit the notification to the remote communications device.

13. The system of claim 11, wherein the communications system further comprises a receiver receiving, from the remote communications device, an instruction to modify the environmental condition of the wildlife containment unit.

14. A method for humane capture, maintenance, and release of wildlife, the method comprising:
   guiding, a wild animal into a wildlife capture unit, with a push pole comprised of a handle and a removable component;
   capturing, by a wildlife capture unit, the wild animal in a wildlife containment unit; and
   automatically modifying, by the wildlife capture unit, an environmental condition of a wildlife containment unit to sustain the wild animal upon detection of the capture of the wild animal by a detection device.

15. The method of claim 14, wherein the push pole further comprises an audio system connected to the handle.

16. The method of claim 14, wherein the removable component of the push pole is formed of a transparent material.

17. The method of claim 14, further comprising receiving, by the wildlife capture unit, from a remote communications device, an instruction to modify the environmental condition of the wildlife containment unit.

18. The method of claim 14, further including transmitting, by the wildlife capture unit, to a remote communications device, a notification of the capture of the wild animal.

* * * * *